(12) United States Patent
Skowronek

(10) Patent No.: US 8,037,256 B2
(45) Date of Patent: Oct. 11, 2011

(54) PROGRAMMABLE ADDRESS PROCESSOR FOR GRAPHICS APPLICATIONS

(75) Inventor: Stanislaw K. Skowronek, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 520 days.

(21) Appl. No.: 11/961,758

(22) Filed: Dec. 20, 2007

(65) Prior Publication Data

US 2009/0164726 A1    Jun. 25, 2009

(51) Int. Cl.
    *G06F 12/00*    (2006.01)
(52) U.S. Cl. ......... 711/154; 711/118; 711/158; 711/167
(58) Field of Classification Search .................. 711/118, 711/154, 158, 167
    See application file for complete search history.

(56) References Cited

U.S. PATENT DOCUMENTS

| | | | |
|---|---|---|---|
| 7,124,244 B2 * | 10/2006 | Shimada | 711/113 |
| 2003/0191916 A1 * | 10/2003 | McBrearty et al. | 711/162 |
| 2006/0075193 A1 * | 4/2006 | Magoshi | 711/122 |
| 2007/0239973 A1 * | 10/2007 | Wiese et al. | 712/233 |

* cited by examiner

*Primary Examiner* — Jae Yu
(74) *Attorney, Agent, or Firm* — Sterne, Kessler, Goldstein & Fox P.L.L.C.

(57) ABSTRACT

Methods and systems for processing memory lookup requests are provided. In an embodiment, an address processing unit includes an instructions module configured to store instructions to be executed to complete a primary memory lookup request and a logic unit coupled to the instructions module. The primary memory lookup request is associated with a desired address. Based on an instruction stored in the instructions module, the logic unit is configured to generate a secondary memory lookup request that requests the desired address.

In another embodiment, a method of processing memory lookups requests includes receiving a primary memory lookup request that corresponds to a desired memory address and generating a plurality of secondary memory lookup requests.

21 Claims, 10 Drawing Sheets

PROGRAMMABLE ADDRESS PROCESSOR FOR GRAPHICS APPLICATIONS

BACKGROUND OF THE INVENTION

1. Field of the Invention

The present invention generally relates to computer systems. More particularly, the present invention relates to computer systems that use memory lookups.

2. Related Art

In many processing systems, memory lookups, i.e., operations that retrieve information from memory or update information stored in memory, are often costly in terms of processing time, and thus are an important bottleneck that often restricts performance. For example, graphics processor units (GPUs) often process instructions that result in a series of associated memory lookups being executed. In such a case, memory lookups often severely limit the performance of the GPU.

Systems have been developed to decrease the cost associated with memory lookups. For example, caches have been developed that allow for relatively quick access to information that is needed frequently. Advanced caches and algorithms that populate caches in an efficient manner have further decreased the cost associated with memory lookups. However, the cost associated with memory lookups still remains relatively high when compared to the cost related to the processing time of an instruction. Thus, what is needed are systems and methods that reduce the time required to complete memory lookups.

BRIEF SUMMARY OF THE INVENTION

Embodiments described herein relate to methods and systems for processing memory lookup requests. In an embodiment, an address processing unit includes an instructions module configured to store instructions to be executed to complete a primary memory lookup request and a logic unit coupled to the instructions module. The primary memory lookup request is associated with a desired address. Based on an instruction stored in the instructions module, the logic unit is configured to generate a secondary memory lookup request that requests the desired address.

In another embodiment, a method of processing memory lookup requests includes receiving a primary memory lookup request that corresponds to a desired memory address and generating a plurality of secondary memory lookup requests. Each secondary memory lookup request of the plurality of secondary memory lookup requests is associated with the primary memory lookup request. A secondary memory lookup request of the plurality of secondary memory lookup requests corresponds to the desired address.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Processing Environment

Figure 1:
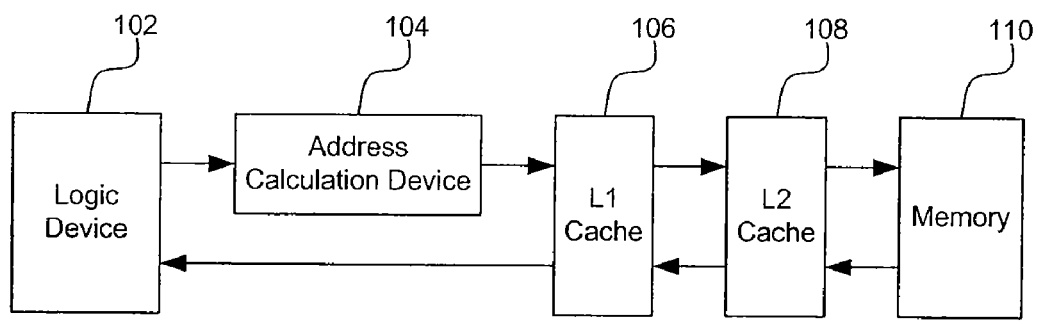
FIG. 1 is a block diagram illustration of a conventional computer system.

FIG. 1 is a block illustration of a conventional processing unit 100. Processing unit 100 may be a central processing unit (CPU), a graphics processing unit (GPU), or other type of processing unit, as would be understood by those skilled in the relevant art(s). Processing unit 100 includes a logic device 102, an address calculation device 104, an L1 cache 106, an L2 cache 108, and a memory 110.

Logic device 102 is configured to execute one or more instructions. For example, logic device 102 may be a shader core in a GPU that is configured to perform shading operations. The instructions executed by logic device 102 often involve manipulating information that is stored in memory 110. Stored information in memory 110 can be accessed by transmitting a memory lookup request that includes a desired address corresponding to the location of the desired information in memory 110. In such a manner, the desired information is said to be located at the desired address in memory 110. The returned information is said to be the result of the transmitted memory lookup request. In the exemplary processing unit, memory 110 is implemented as a random access memory (RAM), read-only memory (ROM), a combination thereof, or other memory type as would be appreciated by those skilled in the relevant art(s).

Address calculation device 104 is configured to initially process a memory lookup request transmitted by logic device 102. In an embodiment, address calculation device 104 translates a desired address into a form that can be processed by memory 110 in a more efficient manner. For example, address calculation device 104 can be configured to translate a desired address into a base component and an N component. The base component may be a base address and the N component may be the distance from the base address to the desired address.

However, the time between when a memory lookup request is transmitted by logic device 102 and when the corresponding result is received by logic device 102, i.e., the memory latency, is often much greater than the time it takes for logic device 102 to execute an instruction, i.e., the instruction latency. Thus, memory lookups often limit the performance of logic device 102. To decrease the memory latency, processing unit 100 also includes L1 cache 106 and L2 cache 108. L1 cache 106 and L2 cache 108 each have a plurality of entries. Each entry of L1 cache 106 and L2 cache 108 includes information stored in memory 110 and the address where the information is located in memory 110. L1 cache 106 and L2 cache 108 can provide relatively fast access, as compared to memory 110, to stored information. L1 cache 106 is smaller than L2 cache 108, but also quicker in providing results to memory lookup requests.

In processing an instruction, logic device 102 transmits a memory lookup request. The memory lookup request is received by L1 cache 106. If a cache hit occurs, i.e., the desired address matches an address stored in L1 cache 106, L1 cache 106 returns the desired information to logic device 102. If a cache miss occurs, i.e., the desired address does not match an address stored in L1 cache 106, the memory lookup request is transmitted to L2 cache 108. L2 cache 108 is typically larger than L1 cache 106, thus increasing the likelihood of a cache hit, but also has a greater memory lookup time than L1 cache 106. If a cache hit occurs at L2 cache 108, the desired value is transmitted to logic device 102. If a cache miss occurs at L2 cache 108, the memory lookup request is transmitted to memory 110 which returns the stored information to logic device 102 if the desired address exists in memory 110.

Logic device 102 transmits a primary memory lookup request that requires a series of secondary memory lookup requests to be generated so that the desired information of the primary memory lookup can be returned. For example, logic device 102 requests information contained within a linked list, tree, or other data structure. To access such information, several memory lookups may be required to obtain the desired value. For example, in requesting the second entry of a linked list, a first memory lookup may have to be requested to obtain the first entry of the linked list. The first entry of the linked list then provides the address of the desired second entry of the linked list. A memory lookup is then finally executed to obtain the desired second entry.

In the case that a primary memory lookup request misses at L1 cache 106 and hits at L2 cache 108, the memory latency, may be expressed as:

$$t = M(t_A + t_{L1} + t_{DL1} + t_{L2} + t_{DL2})$$ Equation 1 where t is the memory latency, $t_A$ is the time required by address calculation device 104 to translate the desired address of each memory lookup request, $t_{L1}$ is the time required by L1 cache 106 to determine a cache miss for each memory lookup request, $t_{L2}$ is the time required by L2 cache 108 to retrieve the information stored at the desire address of each memory lookup request, $t_{DL2}$ is the time required to transmit the stored information from L2 cache 108 to L1 cache 106 for each memory lookup request, $t_{DL1}$ is the time required to transmit the stored information from L1 cache 106 to logic device 102 for each memory lookup request, and M is the number of memory lookups required to complete the primary memory lookup request.

As would be appreciated by those skilled in the relevant art(s), the memory latency specified in Equation 1 for a primary memory lookup request often leads to a significant degradation in performance for processing unit 100. In embodiments described herein, methods and systems for address processing are provided that allow for memory lookup requests to be executed more efficiently.

Figure 2:
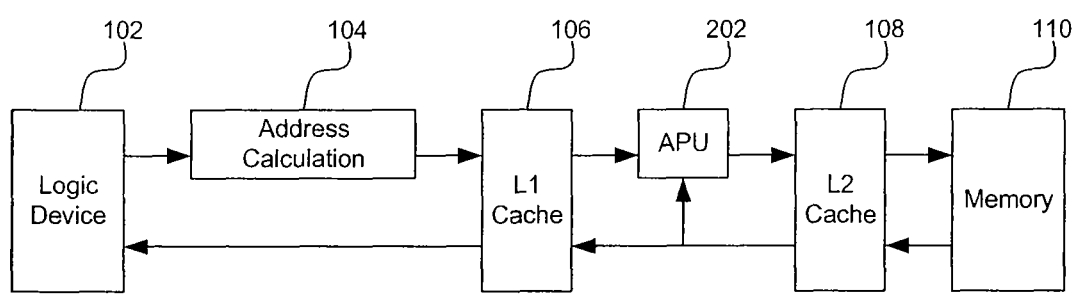
FIG. 2 is a block diagram illustration of a computer system, according to an embodiment of the present invention.

FIG. 2 is a block illustration of a processing unit 200, according to an embodiment of the present invention. Processing unit 200 is generally similar to processing unit 100 described with reference to FIG. 1. However, processing unit 200 additionally includes an address processing unit (APU) 202.

APU 202 is configured to receive a primary memory lookup requests and generate secondary memory lookup requests. As shown in FIG. 2, APU 202 is located between L1 cache 106 and L2 cache 108. In such an embodiment, APU 202 receives memory lookup requests that miss in L1 cache 106 as primary memory lookup requests and generates secondary memory lookup requests that are received by L2 cache 108. For example, in the case that a memory lookup request for the $M^{th}$ entry in a linked list misses in L1 cache 106, that memory lookup request is received at APU 202. APU 202 then generates M−1 intermediate secondary memory lookup requests to obtain intermediate returns that provide the necessary information to generate a final secondary memory lookup request that requests the desired address. In embodiments described herein, APU 202 transmits the generated secondary memory lookup requests. Alternatively, APU 202 may generate the secondary memory requests and have another component transmit those memory lookup requests.

As shown in FIG. 2, returns from L2 cache 108 can be received by APU 202 and/or L1 cache 106. In an embodiment, returns to intermediate secondary memory lookup requests are intercepted by APU 202, i.e., received by APU 202 and not received by L1 cache 106. Returns to the intermediate secondary memory lookup requests are processed by APU 202 to obtain the information required to transmit one or more subsequent memory lookup requests. In a further embodiment, APU 202 only holds the portions of returns that are required to generate one or more subsequent secondary memory lookup requests.

In a further embodiment, the return to the final secondary memory lookup request is not intercepted by APU 202, but is rather received by L1 cache 106. The return to the final secondary memory lookup request is then stored in an entry of L1 cache 106 and returned to logic device 102. If logic device 102 again transmits a primary memory lookup request that requests the previously desired address, a cache hit occurs at L1 cache 106 as long as the entry has not yet been removed from L1 cache 106.

Thus, in such an embodiment, L1 cache 106 acts as a result storage of APU 202 that stores the results of the primary memory lookup requests transmitted by logic device 102 that miss in L1 cache 106. L2 cache 108 acts like an L1 cache, i.e., the smallest and fastest available cache that provides relatively quick access to stored elements (compared to memory 110) to APU 202. In the case that a secondary memory lookup request misses at L2 cache 108, that memory lookup request is transmitted to memory 110. Memory 110 then provides a corresponding return including the information located at the desired address of the secondary memory lookup request to L2 cache 108 if the desired address exists in memory 110. L2 cache 108 then stores the information in an entry and transmits the information to APU 202 and/or L1 cache 106.

In the case that a primary memory lookup request misses at L1 cache 106 and hits in L2 cache 108, the latency for such a memory lookup request may be expressed as:

$$t = t_A + t_{L1} + t_{DL1} + M(t_{L2} + t_{DL2}) + t_p \quad \text{Equation 2}$$

where $t_p$ is the total processing time required by APU 202.

As would be apparent to those skilled in the relevant art(s), Equation 2 may be subtracted from Equation 1 to obtain the time saved through the addition of APU 202. The time saved by through the addition of the APU 202, then, may be expressed as:

$$t_s = (M-1)(t_A + t_{L1} + t_{DL1}) - t_p \quad \text{Equation 3}$$

where $t_s$ is the total time saved.

In an embodiment where APU 202 does not perform computationally intensive operations, $t_p$ can be considered relatively small compared to total latency. Thus, as shown by Equation 3, the addition of APU 202 results in a substantial reduction in the latency associated with memory lookups that require associated memory lookups to be completed and miss in L1 cache 106.

APU 202 is placed between L1 cache 106 and L2 cache 108 in FIG. 2 merely by way of example. In alternate embodiments, APU 202 may be placed in other locations in processing unit 200. For example, APU 202 may be placed between L2 cache 108 and memory 110. In such a case, memory lookup requests that miss in L2 cache 108 would be received as primary memory lookup requests at APU 202.

Furthermore, FIG. 2 also only shows one APU (i.e., APU 202). In alternate embodiments, a processing unit may have multiple APUs. For example, an APU may also be located between L2 cache 108 and memory 110. Additionally or alternatively, another APU may be placed between L1 cache 106 and L2 cache 108. Such a configuration may be used to process embedded primary lookup requests (e.g., a linked list where each entry is also a linked list).

Address Processing Unit

Figure 3:
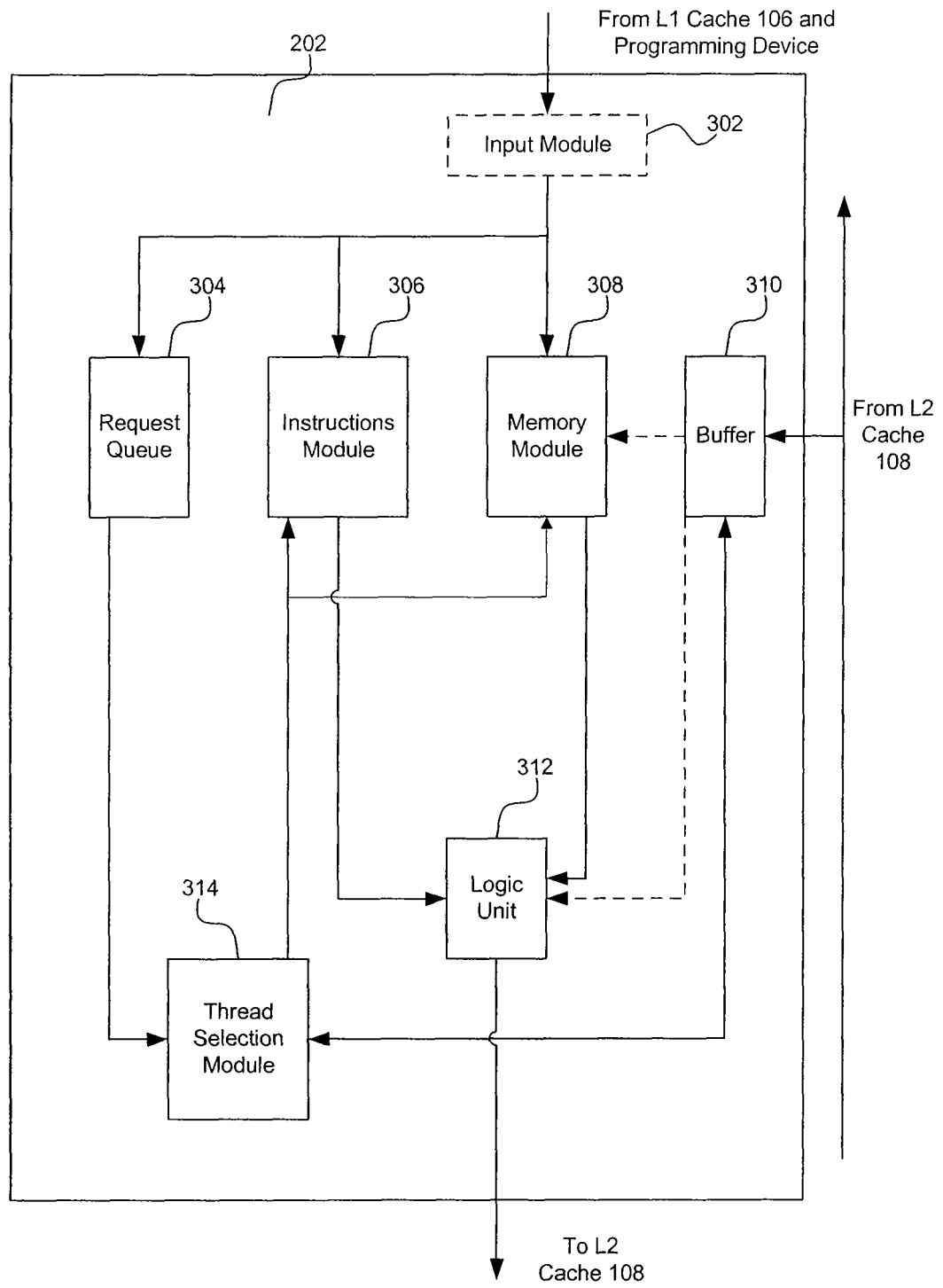
FIG. 3 is a block diagram illustration of an address processing unit, according to an embodiment of the present invention.

FIG. 3 is a block illustration of APU 202, according to an embodiment of the present invention. APU 202 includes a request queue 304, an instructions module 306, a memory module 308, a buffer 310, a logic unit 312, and a thread selection module 314. APU 202 optionally includes an input module 302.

As shown in FIG. 3, input module 302 is coupled to L1 cache 106. In an embodiment, input module 302 is configured to receive primary memory lookup requests from L1 cache 106 and to determine a type associated with and generate a thread corresponding to the received primary memory lookup request. As shown in FIG. 3, input module 302 is coupled to request queue 304 and instructions module 306.

Request queue 304 is configured to hold threads corresponding to primary memory lookup requests. For example, request queue 304 is configured to hold 60 threads. In an embodiment, request queue 304 is a re-order request queue configured to order held threads so that returns to primary memory lookup requests are provided in a desired order.

APU 202 can be configured to operate as a multi-threaded device. In a single-threaded device, a thread is only executed once all threads that were received before it, i.e., all of the older threads, are executed first or in another predefined order. In such a configuration, the device remains essentially idle as it waits for returns for results of secondary memory lookup requests. In contrast, a multithreaded device, such as APU 202, allows multiple threads to be in some phase of execution at a single time. For example, if, in response to a first thread, a secondary memory lookup request is transmitted, instructions relating to a second thread may be executed so that APU 202 is not idle during the time required for the transmitted secondary memory lookup request to be executed.

However, in an embodiment, L1 cache 106 requires returns to primary memory lookup requests to be provided in the order that the primary memory lookup requests were transmitted. In the multi-threaded embodiment, generated threads tend to become out of order. In other words, younger threads may be completed before older threads. Thus, request queue 304 can be configured to operate as a re-order queue that allows threads to issue intermediate secondary memory requests in any order, but only allows a thread to issue its final secondary memory request so that a predefined order to the returns to the primary memory lookup requests is maintained. In a further embodiment, the desired order corresponds to a first in first out (FIFO) order in which request queue 304 only allows a thread to issue their final secondary memory lookup request once all older threads have issued their final secondary memory lookup requests.

Input module 302 is also coupled to instructions module 306. Instructions module 306 is configured to store instructions that are to be executed to complete primary memory lookup requests.

Figure 4:
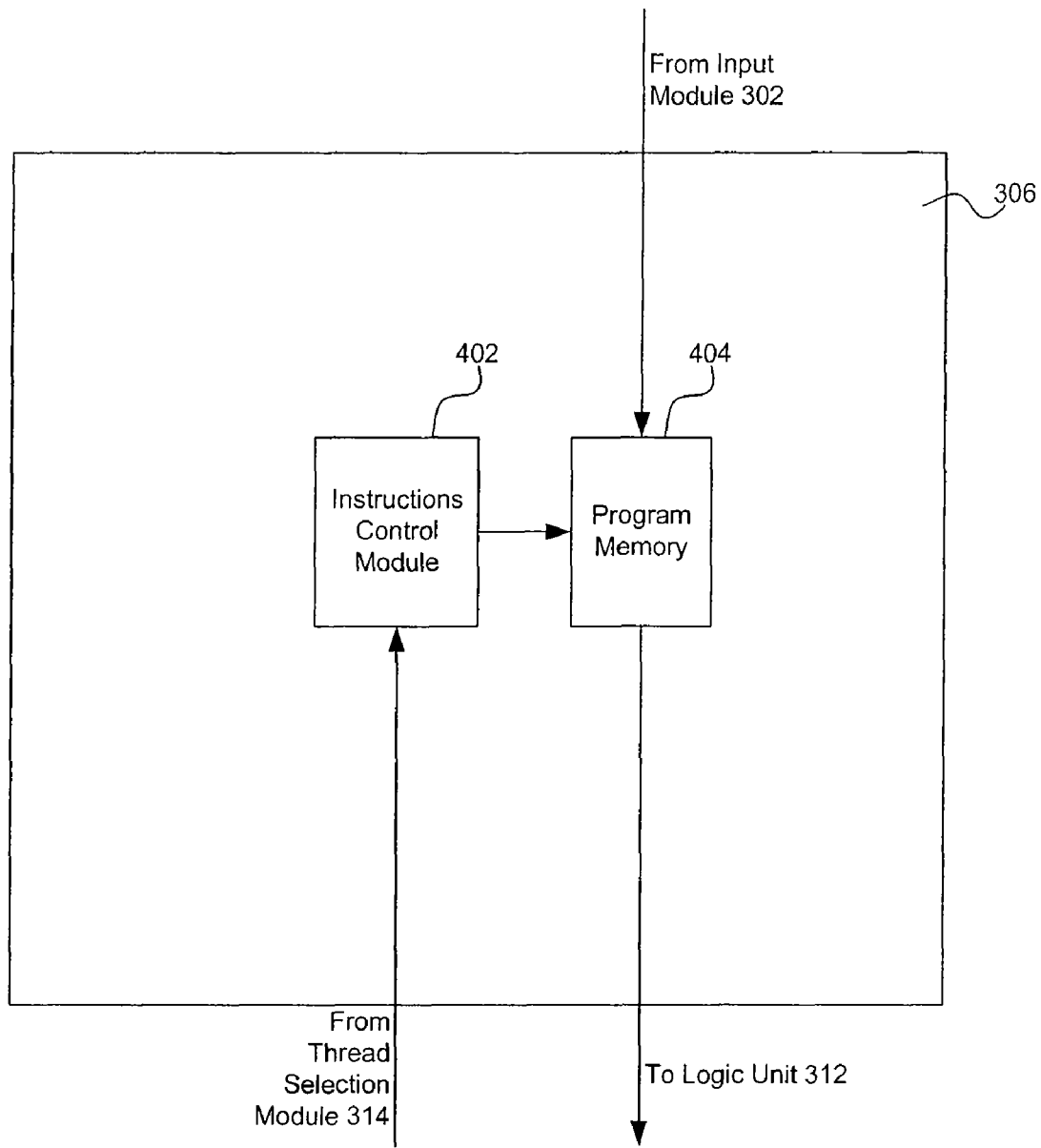
FIG. 4 is a block diagram illustration of an instructions module, according to an embodiment of the present invention.

FIG. 4 is block illustration of an exemplary implementation of instructions module 306, according to an embodiment of the present invention. As would be appreciated by those skilled in the relevant art(s), instructions module 306 may be implemented using alternative implementations without departing from the scope and spirit of the present invention. As shown in FIG. 4, instructions module 306 includes an instructions control module 402 and a program memory 404.

Program memory 404 is configured to store instructions. In an embodiment, program memory 404 is configured to store instructions from input module 302, as shown in FIG. 4, or from an outside source, i.e., outside APU 202 (not shown). By way of example, program memory 404 is implemented as an 8 k bit memory. Program memory 404 is configured to store instructions that are organized according to different types of threads. For example, program memory 404 includes a first set of instructions that are to be executed when a thread type indicates a linked list traversal and a second set of instructions that are to be executed when a thread type indicates a tree traversal. As would be appreciated by those skilled in the relevant art(s), instructions for different types may overlap. For example, one or more instructions to be executed for a linked list traversal may also be executed for a tree traversal.

Program memory 404 is coupled to instructions control module 402. Instructions control module 402 is configured to select instructions from program memory 404 based at least on a thread type. For example, if thread selection module 314 indicates that a linked list traversal type thread is to be executed, instructions control module 402 selects the appropriate instructions from program memory 404.

In a further embodiment, instructions control module 402 maintains a program counter. The program counter points to an instruction in program memory 404 to be executed by logic unit 312. After an instruction is executed by logic unit 312, the program counter is updated to point to the next instruction to be executed by logic unit 312. In the embodiment that APU 202 is a multi-threaded device, instructions control module 402 can further be configured to maintain a separate program counter for each thread selected by thread selection module 314. Thus, a new program counter may be generated each time a new thread is selected by thread selection module 314. A new thread may be defined as a thread for which no instructions have been executed. Each time thread selection module 314 selects a previously selected thread, instructions control module 402 may retrieve the corresponding program counter.

Returning to FIG. 3, memory module 308 is also coupled to input module 302. Memory module 308 is configured to store information relevant to primary memory lookup requests.

Figure 5:
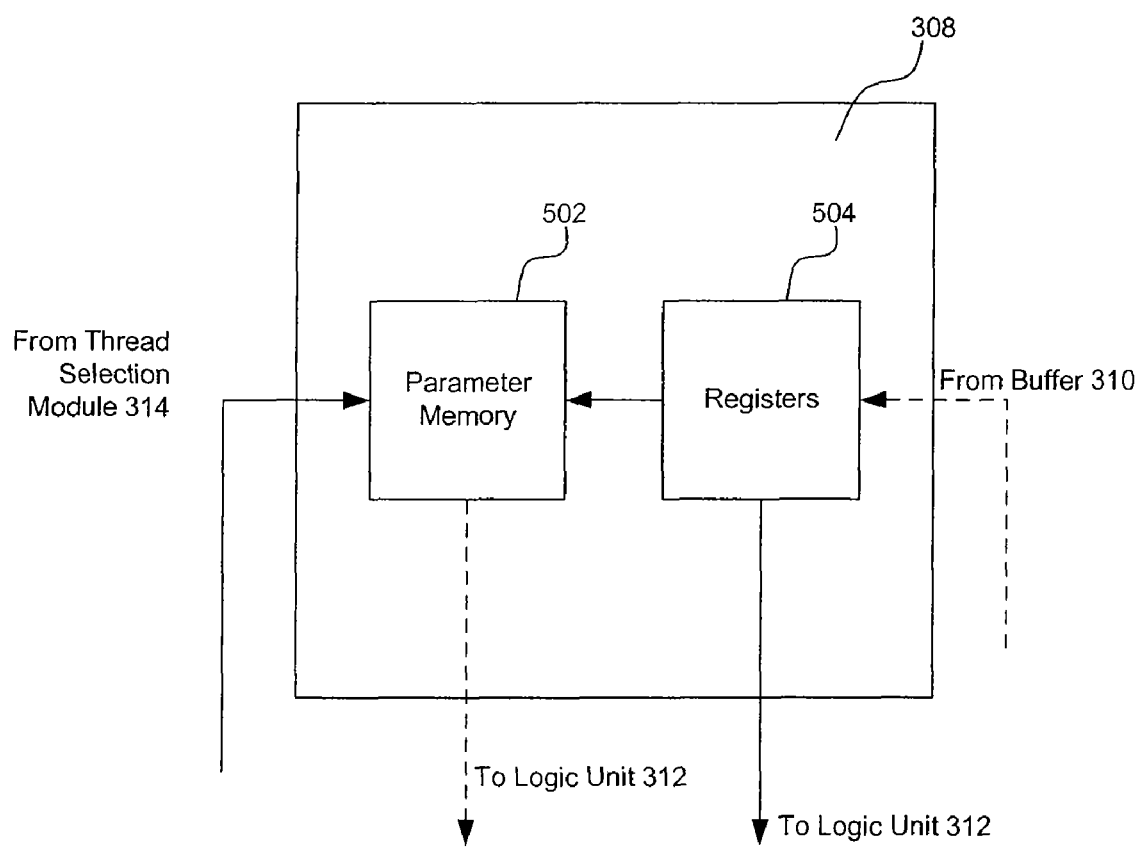
FIG. 5 is a block diagram illustration of a memory module, according to an embodiment of the present invention.

FIG. 5 is block diagram illustration of an exemplary implementation of memory module 308, according to an embodiment of the present invention. As would be appreciated by those skilled in the relevant art(s), memory module 308 may be implemented using alternative implementations without departing from the scope and spirit of the present invention. As shown in FIG. 5, memory module 308 includes a parameter memory 502 and registers 504.

Parameter memory 502 is configured to store constants that can be required to complete a primary memory lookup request. Parameter memory 502 may be configured accept constants from an outside source, i.e., outside of APU 202 (not shown). In the exemplary illustration of FIG. 5, parameter memory 502 is implemented as a 1 k bit memory.

Parameter memory 502 is configured to hold the base address and N components of a desired memory address. Although referred to as constants herein, the entries of parameter memory 502 can only be constant with respect to the execution of a thread. In other words, the constants stored by parameter memory 502 can be constant during the execution of a given thread, but can change after a thread is completed, e.g., when that information is no longer needed.

Memory module 308 also includes registers 504. The contents of registers 504 are operated on by logic unit 312 based on instructions from instructions module 306. For example, an instruction can stipulate adding a first register of registers 504 to a second register of registers 504 and storing the result in a third register of registers 504. In the exemplary embodiment of FIG. 5, registers 504 includes 8 k bits of register space.

As shown in FIG. 5, parameter memory 502 is coupled to thread selection module 314 and is optionally coupled to registers 504. In such an embodiment, relevant entries of parameter memory 502 based on the thread selected by thread selection module 314 are loaded into registers of registers 504. Additionally or alternatively, parameter memory 502 can be coupled to logic unit 312. Thus, through the embodiments listed above, logic unit 312 may indirectly access the contents of parameter memory 502 through registers 504 or directly through a coupling to parameter memory 502.

The contents of registers 504 can also be set by buffer 310. In an embodiment, at least a portion of the results of secondary memory lookup requests can be stored in registers of registers 504 through buffer 310. The operation of buffer 310 will be described in further detail below.

Returning to FIG. 3, both instructions module 306 and memory module 308 are coupled to logic unit 312. Logic unit 312 is configured to generate secondary memory lookup requests. Logic unit 312 is configured to execute instructions received from instructions module 306 based on information stored in memory module 308 and/or buffer 310. In executing the received instructions, logic unit 312 also generates secondary memory requests. For example, a received instruction instructs logic unit 312 to add two values stored in memory module 308, store the sum in memory module 308, and to generate a secondary memory lookup request that has a desired address that corresponds to the computed sum.

As shown in FIG. 3, logic unit 312 is coupled to L2 cache 108. However, in alternate embodiments in which APU 202 is coupled to other elements of processing unit 200, logic unit 312 can be coupled elsewhere. For example, in the embodiment in which APU 202 is located between L2 cache 108 and memory 110, logic unit 312 is coupled to memory 110.

As shown in FIG. 3, buffer 310 can be configured to hold at least a portion of a result of a secondary memory lookup request. The buffer 310 is configured to intercept results of an intermediate secondary memory lookup request and hold at least a portion of the intercepted results. Buffer 310 can allow results to final secondary memory lookup requests to be passed to L1 cache 106.

Buffer 310 can be configured to hold only portions of intercepted results that are necessary to generate one or more subsequent secondary memory lookup requests. In such an embodiment, APU 202 can be configured to use information store elsewhere, for example in memory module 308, so that only a portion of the intercepted result must be stored. For example, if a result is 512 bits, buffer 310 can be configured to hold only the 128 bits of the 512 bits that provide necessary information for one or more subsequent memory lookup requests. Information contained in the other 384 bits of the result is determined based on a base address stored in memory module 308, previously intercepted results, and/or other stored information. Bits of the remaining 384 bits can also represent information that is irrelevant in generating one or more subsequent memory lookup requests. Holding a portion of a result rather than the entire result can save space in buffer 310. Alternatively, buffer 310 can be configured to hold intercepted results in their entirety.

Figure 6:
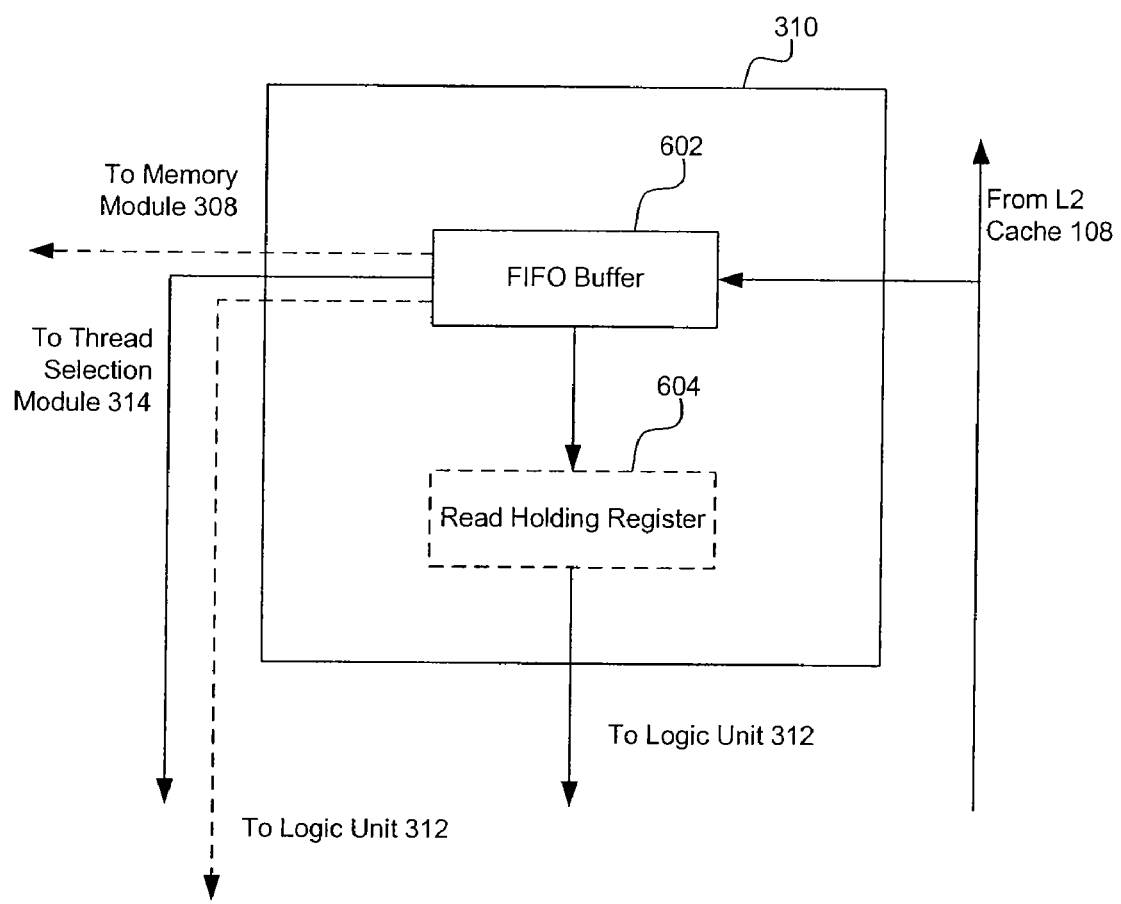
FIG. 6 is a block diagram illustration of a buffer, according to an embodiment of the present invention.

FIG. 6 is a block diagram illustration of an exemplary implementation of buffer 310, according to the present invention. As would be appreciated by those skilled in the relevant art(s), buffer 310 can be implemented using alternative implementations without departing from the scope and spirit of the present invention. As shown in FIG. 6, buffer 310 includes a FIFO buffer 602 and optionally a read holding register 604.

FIFO buffer 602 is configured to hold portions of or complete intercepted results of secondary memory lookup requests. As shown in FIG. 6, FIFO buffer 602 is optionally coupled to memory module 308 and/or logic unit 312. In the embodiment that FIFO buffer 602 is coupled to memory module 308, logic unit 312 can operate on values held in buffer 310 indirectly through memory module 308. Alternatively, if FIFO buffer 602 is coupled to logic unit 312, logic unit 312 operates on information held in buffer 310 directly through the coupling to FIFO buffer 602.

Buffer 310 optionally also includes a read holding register 604. Read holding register 604 is configured to hold entries that correspond to portions of entries held in FIFO buffer 602. Read holding register 604 provides relatively fast, compared to FIFO buffer 602, access to results of secondary memory lookup requests. In an embodiment, read holding register 604 holds a set of entries that have a previously determined relationship. For example, read holding register 604 can be configured to hold four 32-bit entries. Each of the entries may correspond to a different 128-bit entry of FIFO buffer 602. As described above, each 128-bit buffer entry corresponds to a 512-bit result. The number of bits that must be held may be reduced by determining beforehand that the four elements are related. For example, the four entries may be known to correspond to memory addresses that are adjacent. In such a case, only the difference from a common starting address needs to be stored, instead of the entire memory address.

Furthermore, read holding register 604 also allows multiple secondary memory lookup requests to be concatenated. For example, in the case that each 32-bit entry in read holding register 604 corresponds to a 128-bit entry in FIFO buffer 602, four addresses may requested in the same space that would be required to request one 128-bit address.

As would be appreciated by those skilled in the relevant art(s), FIFO buffer 602 and read holding register 604 can be configured to hold results of secondary memory lookup requests in other ways without departing from the scope and spirit of the present invention.

Returning to FIG. 3, APU 202 also includes thread selection module 314 coupled to buffer 310 and request queue 304. Thread selection module 314 is also coupled to instructions module 306 and memory module 308. Thread selection module 314 is configured to select a thread to be executed by APU 202.

Thread selection module 314 can be configured to analyze the states of request queue 304 and buffer 310 and select a thread held in request queue 304 for execution. For example, thread selection module 314 can be configured to select a thread based on the available capacity of request queue 304 and/or buffer 310. For example, thread selection module 314 can choose to execute a thread that is far from completion if buffer 310 and request queue 304 both have a large amount of available capacity. If the capacity of buffer 310 and request queue 304 is decreasing, threads that are close to completion can be selected so that threads can be removed from request queue 304 and entries can be deleted from buffer 310.

In an alternate embodiment, thread selection module 314 can be configured to select a thread based on the probability that request queue 304 and/or buffer 310 will overflow. In such an embodiment, thread selection module 314 can be configured to prevent request queue 304 and/or buffer 310 from overflowing. As would be appreciated by those skilled in the relevant art(s), when a queue or buffer overflows, data can be lost. For example, if request queue 304 overflows, threads corresponding received primary memory lookup requests can be lost.

Thread selection module 314 determines or estimates the probability that request queue 304 and/or buffer 310 will overflow based on the rate at which primary memory lookup requests are being received, the rate at which primary memory lookup requests are being serviced by APU 202, and/or the rate at which request queue 304 and/or buffer 310 are being populated. Thread selection module 314 decides to select a thread for execution that is relatively close to completion if the probability of request queue 304 and/or buffer 310 overflowing is relatively high. Thread selection module 314 decides to select a thread that is relatively far from completion if the probability of request queue 304 and/or buffer 310 overflowing is relatively low. As would be apparent to those skilled in the relevant art(s), thread selection module 314 is configured to select threads for execution based on other criterion without departing from the scope and spirit of the present invention.

As described above, request queue 304 can be a re-order request queue. In such an embodiment, request queue 304 allows thread selection module 314 to choose freely among threads that will not generate their final secondary memory lookup request the next time they are selected. However, request queue 304 may restrict thread selection module 314 in selecting threads that will generate their final secondary memory lookup request the next time they are selected. Request queue 304 only allows threads to be executed in a predetermined order.

For example, request queue 304 can hold first and second threads that both will generate their final secondary memory lookup request the next time they are selected. In the case that the first thread is generated before the second thread, indicating that the primary memory lookup request associated with the first thread was received before the primary memory lookup request associated with the second thread, request queue 304 will not allow the second thread to be selected before the first.

Exemplary Operation

In an exemplary execution, thread selection module 314 selects a linked list traversal type thread from request queue 304. Thread selection module 314 then transmits a signal to instructions module 306 that instructs instructions control module 402 to select linked list traversal type instructions from program memory 404. Thread selection module 314 also transmits a signal to memory module 308 that instructs parameter memory 502 to load information relevant to the selected thread into registers of registers 504. Linked list traversal type instructions are then executed by logic unit 312. One of those instructions instructs logic unit 312 to generate a secondary memory lookup request with that includes a desired addresses corresponding to the entries of read holding register 604 of buffer 310. The generated secondary memory lookup request is then transmitted to L2 cache 108. Thread selection module 314 module then selects another thread from request queue 304 to be executed. When the result of the generated secondary memory lookup request is transmitted by L2 cache 108, it is intercepted if it was an intermediate secondary memory lookup request. Such a process continues as APU 202 continues to process primary memory lookup requests. The operation described above is only provided by way of example and is not meant to limit scope of the present invention.

In an embodiment, APU 202 performs relatively simple computations. Restricting the operation of APU 202 to simple computations increases the speed with which it process instructions and decreases the cost in space and computational power required to implement APU 202.

APU 202 can be implemented using 9 k bits of single port RAM (e.g., for program memory 404 and parameter memory 502), and 3 k bits of 1R1W RAM (e.g., for FIFO buffer 602), 8 k bits of 2R1W RAM (e.g., for registers 504). To implement the processing capabilities of APU 202, between 1000 and 2000 flip-flops (or other logic elements) and a 32-bit integer arithmetic logic unit (ALU) with floating point comparison ability (e.g., for logic unit 312) may be required.

Example Method Embodiments

Figure 7:
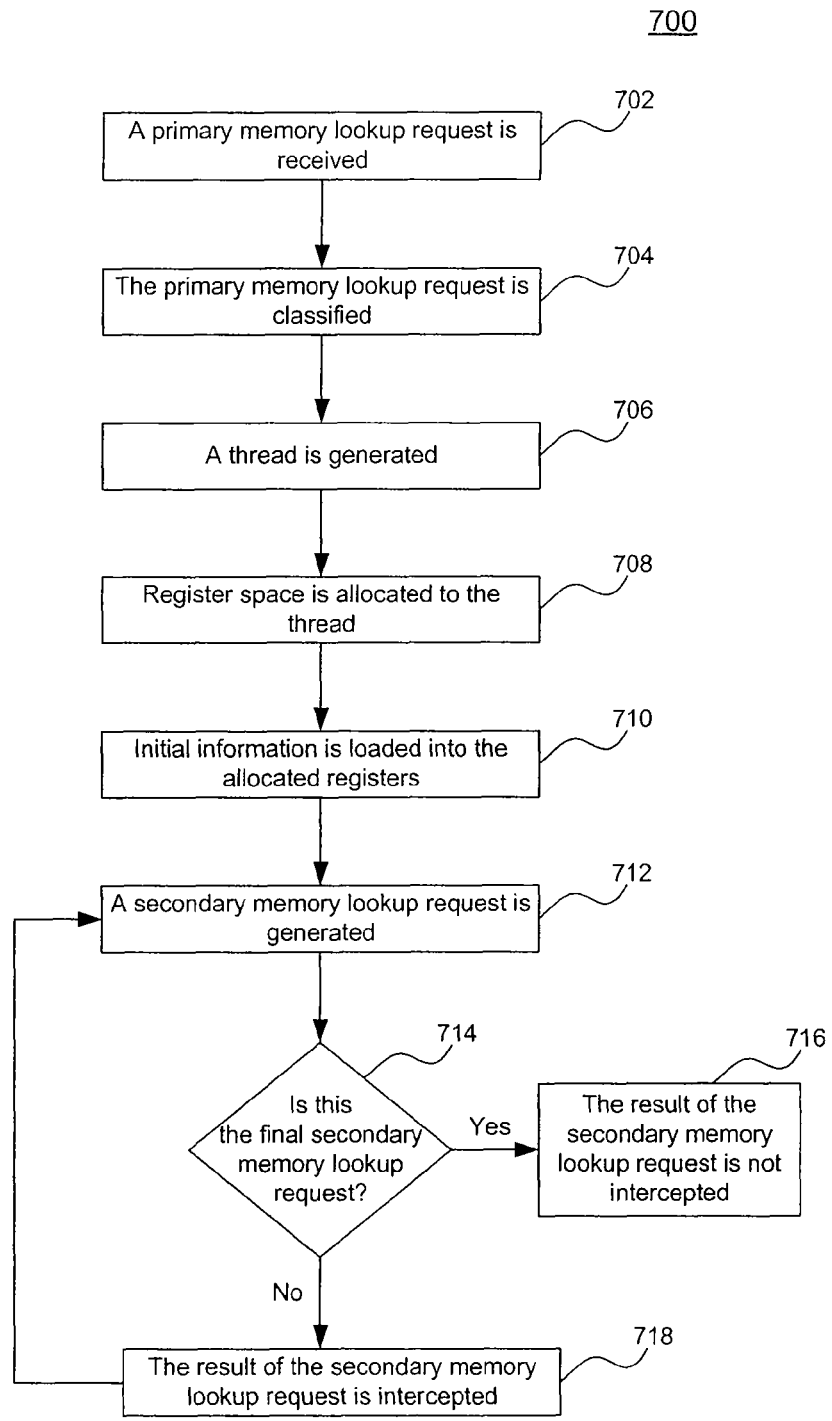
FIGS. 7-8 illustrate process flowcharts for processing memory lookups requests, according to embodiments of the present invention.

FIG. 7 shows flowchart 700 providing example steps for processing memory lookup requests, according to an embodiment of the present invention. Other structural and operational embodiments will be apparent to persons skilled in the relevant art(s) based on the following discussion. Flowchart 700 is described with reference to the embodiment of FIG. 3. However, flowchart 700 is not limited to that embodiment. The steps shown in FIG. 7 do not necessarily have to occur in the order shown. The steps of FIG. 7 are described in detail below.

Flowchart 700 begins with step 702. In step 702, a primary memory lookup request is received. For example, in FIG. 3, input module 302 receives a memory lookup request from L1 cache 106.

In step 704, the primary memory lookup request is classified. For example, in FIG. 3, input module 302 can classify a received primary memory lookup request as a first memory lookup type. For example, the first memory lookup type can be a linked list traversal.

In step 706, a thread corresponding to the received primary memory lookup request is generated. For example, in FIG. 3, input module 302 generates a thread corresponding to the received primary memory lookup request. The generated thread is then held in request queue 304.

In step 708, register space is allocated to the generated thread. For example, in FIG. 3, register space in memory module 308 can be allocated to the generated thread. In the embodiment of FIG. 5, register space within registers 504 of memory module 308 can be allocated to the generated thread.

In step 710, initial information is loaded into registers of the allocated register space. For example, in FIG. 3, memory module 308 loads a base address associated with the desired address of the received primary memory lookup request into one or more registers of the allocated register space. In the embodiment of FIG. 5, program memory 502 loads the base address into one or more registers of the allocated register space of registers 504.

In step 712, a secondary memory lookup request is generated. For example, in FIG. 3, logic unit 312 executes an instruction stored in instructions module 306. In executing the instruction, logic unit 312 generates a secondary memory lookup request.

In the embodiment of FIG. 4, instructions control module 402 selects a group of instructions from program memory 404 that are to be executed for a linked list memory lookup request. In an embodiment, instructions control module 402 updates the program counter as instructions are executed by logic unit 312.

In decision step 714, it is determined whether the generated secondary memory lookup request is the final secondary memory lookup request associated with the generated thread. As described above a final secondary memory lookup request requests the desired address associated with the received primary memory lookup request.

In an embodiment, a thread that will generate its final secondary memory lookup request the next time it is selected is marked as such. The generated thread can be marked by setting one or more bit fields in the generated thread. Thus, in such an embodiment, decision step 714 includes determining if a predefined bit field is set.

If it is determined that the generated secondary memory lookup request is the final secondary memory lookup request associated with the generated thread, step 716 is reached. In step 716, the result of the generated secondary memory lookup request is not intercepted. For example, in FIG. 3, the result transmitted by L2 cache 108 is not intercepted by buffer 310. In an embodiment, the result is allowed to continue to L1 cache 106.

If it is determined that the generated secondary memory lookup request is not the final secondary memory lookup request associated with the generated thread, step 718 is reached.

In step 718, the result of the generated secondary memory lookup request is intercepted. For example, in FIG. 3, buffer 310 intercepts the result transmitted by L2 cache 108. As described above, buffer 310 holds a portion of the result or hold the result in its entirety.

In the embodiment of FIG. 6, the result, or a portion thereof, can be held in FIFO buffer 602. In an embodiment, buffer 310 loads the result into a register of the allocated register space in memory module 308 so the result can be used in generating another secondary memory lookup request.

As shown in FIG. 7, after step 718 is completed step 712 is again reached. In an embodiment, secondary memory lookups are repeatedly generated until the final secondary memory lookup request associated with the generated thread is generated.

Figure 8:
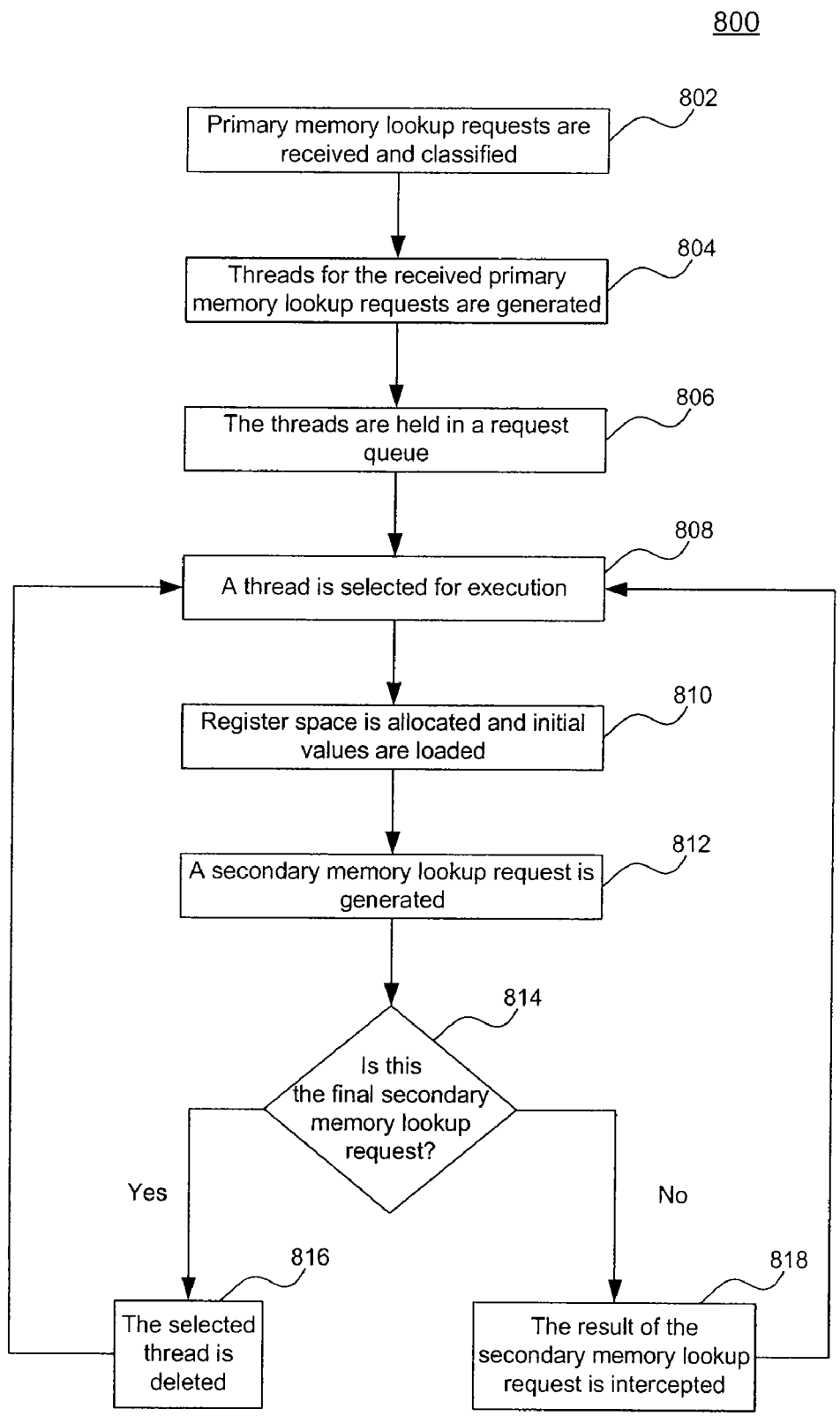

FIG. 8 shows flowchart 800 providing example steps for processing memory lookup requests, according to an embodiment of the present invention. Other structural and operational embodiments will be apparent to persons skilled in the relevant art(s) based on the following discussion. Flowchart 800 is described with reference to the embodiment of FIG. 3. However, flowchart 800 is not limited to that embodiment. The steps shown in FIG. 8 do not necessarily have to occur in the order shown. The steps of FIG. 8 are described in detail below.

Flowchart 800 begins with step 802. In step 802, primary memory lookup requests are received and classified. In an embodiment, primary memory lookup requests are received and classified in a manner similar to steps 702 and 704 described with reference to flowchart 700 above. For example, input module 302 receives a first primary memory lookup request and a second primary memory lookup request. The first primary memory lookup request can be classified as a linked list traversal and the second primary memory lookup request may be classified as a tree traversal.

In step 804, threads for the received primary memory lookup requests are generated. Threads are generated for the received primary memory lookup requests in a manner similar to step 706 described with reference to flowchart 700 above. For example, first and second threads are generated for the first and second received primary memory lookup requests, respectively.

In step 806, the threads are held in a request queue. For example, in FIG. 3, the threads can be held in request queue 304.

In step 808, a thread is selected for execution. For example, in FIG. 3, thread selection module 314 selects the first thread for execution. As described above, thread selection module 314 selects the first thread for execution based on the available capacity of request queue 304 and/or buffer 310, the probability that request queue 304 and/or buffer 310 will overflow, or other criteria.

In step 810, register space is allocated to the selected thread and relevant information is loaded into the allocated register space. For example, in FIGS. 3 and 5, relevant information can be loaded into the allocated register space of registers 504 from parameter memory 502 and/or buffer 310. In such an embodiment, relevant information may include constants defined before the execution of the thread (e.g., a base address stored in parameter memory 502, portions of a result that may be used to generate subsequent secondary memory lookup requests, and/or other information relevant to the generation of secondary memory lookup requests for the thread.

In step 812, a secondary memory lookup request is generated. For example, in FIG. 3, logic unit 312 generates a secondary memory lookup based on instructions stored in instructions module 306. As shown in FIG. 3, the generated secondary memory lookup request can be transmitted to L2 cache 108.

In decision step 814, it is determined whether the generated secondary memory lookup request is the final secondary memory lookup request associated with the selected thread. For example, in FIG. 3, buffer 310 determines whether the generated secondary memory lookup request is the final secondary memory lookup request associated with the first thread.

If the generated secondary memory lookup request is the final secondary memory lookup request associated with the selected thread, step 816 is reached. In step 816, the selected thread is deleted. For example, in FIG. 3, the first thread can be deleted from request queue 304.

If the generated secondary memory lookup request is not the final secondary memory lookup request associated with the selected thread, step 818 is reached. In step 818, a result to the generated secondary memory lookup request is intercepted. Step 816 is executed in a manner substantially similar to step 716 described with reference to flowchart 700.

Buffer 310 interacts with request queue 304 through thread selection module 314 or a coupling (not shown) to decide whether a portion of a result should be intercepted. For example, as a result is transmitted by L2 cache 108, buffer 310 can determine that a portion of the transmitted result should be intercepted if the corresponding thread still exists (i.e., has not yet been deleted) in request queue 304. If the corresponding thread does not exist in request queue 304, indicating that the corresponding thread has issued its final secondary memory lookup request, buffer 310 may not intercept the result.

As shown in FIG. 8, after the completion of either step 816 or step 818, step 808 is reached. Step 808 is reached before step 816 or 818 is reached. In the embodiment of FIG. 8, processing can continue without having to wait for the selected thread to be deleted or for the result of the generated secondary memory lookup request to be transmitted by L2 cache 108. As described above, the latency associated with a memory lookup is typically much larger than the latency associated with executing an instruction. Instead of waiting for the result to be transmitted, another thread can be selected and processing for the newly selected thread may be executed. Thus, processing received primary memory lookup requests in a multi-threaded environment leads to more efficient usage of the processing capabilities of the device handling the received primary memory lookup requests.

In the embodiments described above, an APU has been described as a device that processes primary memory lookup requests. However, in alternative embodiments, an APU can also be used to process other types of memory lookup requests. For example, an APU can be used to process memory lookup requests that request a single desired address, i.e., requests that do not require multiple secondary requests.

Example Graphics Processing Embodiments

Aspects of the present invention may be applied in graphical processing units to increase the efficiency of memory lookups. For example, the methods and systems described herein may be applied to data structure traversals that may involved when dealing with vector textures (e.g., font rendering), texture trees (e.g., wavelet decompression), isosurface extraction, grid computations involved in graph processing (e.g., fast fluid dynamics), sparse matrices as applied in physics and elsewhere, and other tasks as would be appreciated by those skilled in relevant art(s).

In the above mentioned examples, linked list, trees, and combinations thereof are traversed in a series of dependent memory lookups with a series of computations that involve relatively simple computations (e.g., comparisons), and thus may be ideal for an APU with limited computational resources. The results of the traversals are often reused by elements of a GPU.

Figure 9A:
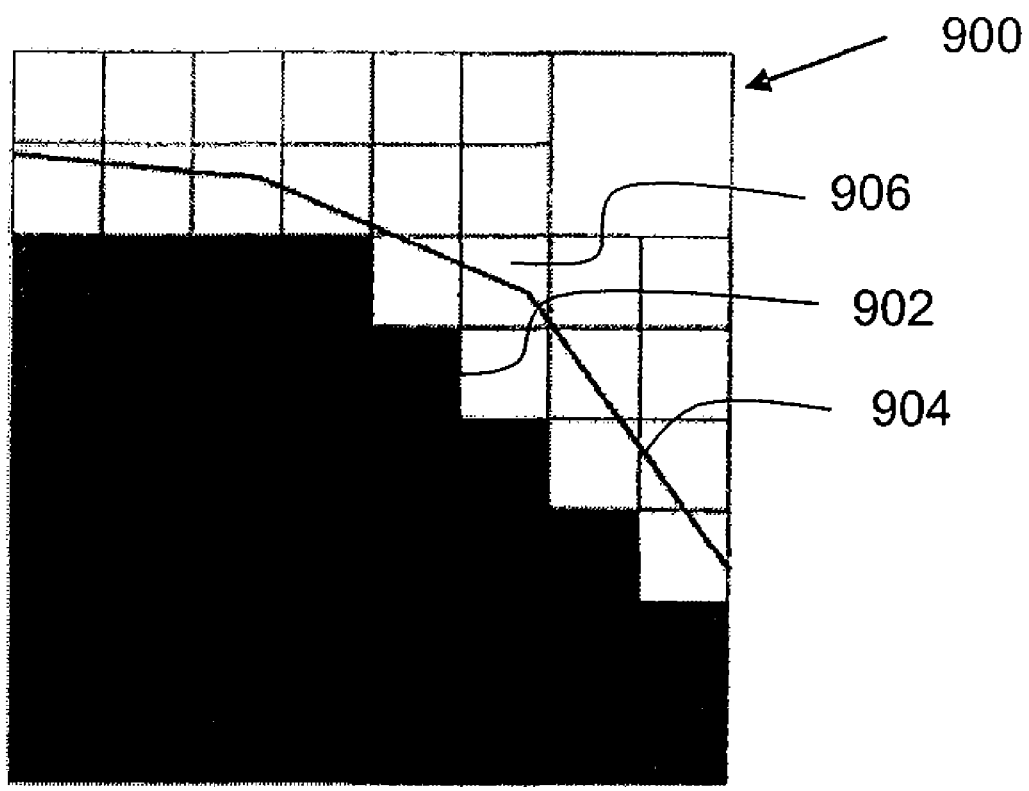
FIG. 9A shows a graphical representation of cells and boundaries associated with memory look-up requests in accordance with an embodiment of the present invention.
Figure 9B:
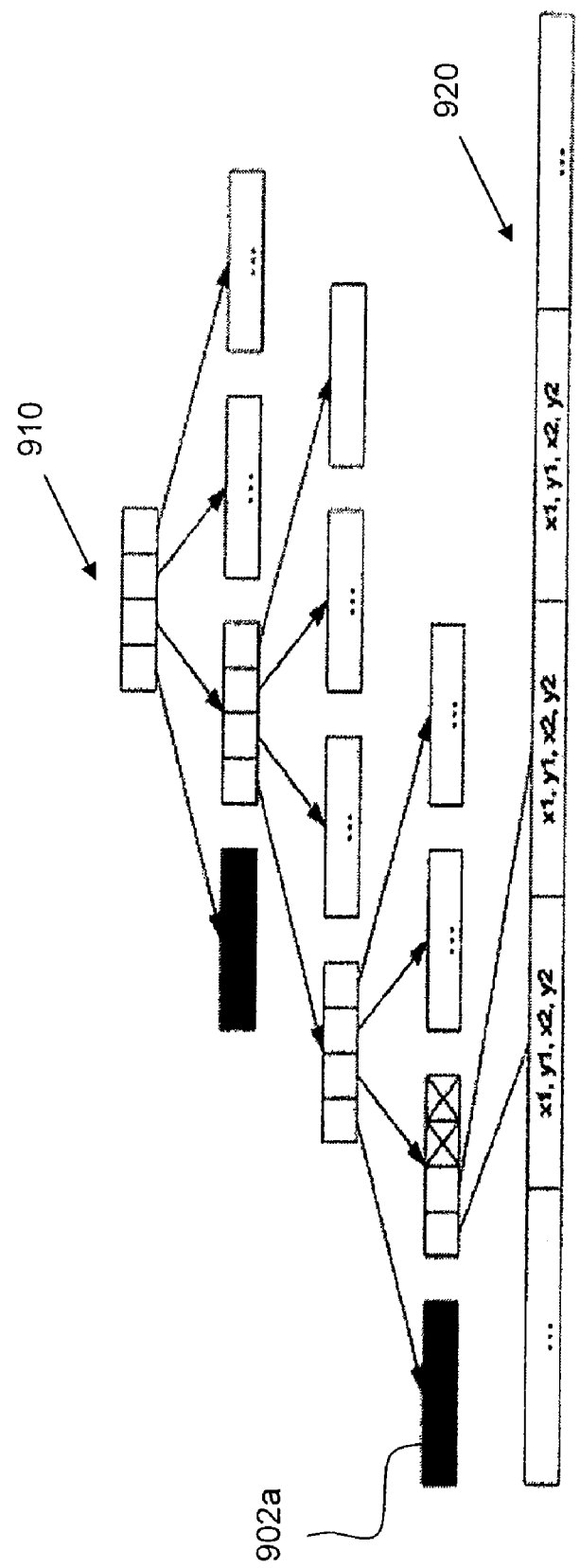
FIG. 9B shows a quadtree and a vector table, according to embodiments of the present invention.

For example, FIG. 9A is an illustration of a graphic 900. FIG. 9B is an illustration of a quadtree 910 used to represent graphic 900 and a vector table 920. In accessing a cell 902 of graphic 900, which corresponds to node 902a in quadtree 910, a series of dependent memory lookups requests must be generated. Systems and methods provided herein can be applied so that a single request can be made for node 902a of quadtree 910 and the appropriate secondary memory lookups may be requested by an APU to return node 902a.

Moreover, graphic 900 also includes a boundary 904. In an embodiment, a bitmap can be used to represent cells of graphic 900 that do not interact with boundary 904. Cells that do interact with boundary 904 (e.g., a cell 906) can be represented as vector textures. In such an embodiment, additional details can be provided to areas that are along the boundary, i.e., ones where additional detail may be helpful, while memory usage can be saved using a bitmap to represent areas that can be displayed effectively with relatively low detail. In such an embodiment, an APU can be used to traverse a quadtree to find areas that require relatively high detail and return those areas to a processing device such as a shader core.

Furthermore, a similar process in which an APU traverses a tree (e.g., a quadtree as described above, a binary space partitioning (BSP) tree, etc.) and returns nodes that may require additional detail may be applied to processing involving isosurface extraction, dynamic graphs, tiling operations, and adaptive texture compression as well as other operations, as would be understood by those skilled in the relevant art(s).

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
    an instructions module configured to store instructions to be executed to complete a primary memory lookup request;
    a logic unit coupled to the instructions module;
    wherein the primary memory lookup request corresponds to a first address in a memory, wherein based on an instruction stored in the instructions module, the logic unit is configured to generate first and second secondary memory lookup requests, and wherein the first secondary memory lookup request corresponds to the first address in the memory and the second secondary memory lookup request corresponds to a second address in the memory, the second address being different from the first address; and
    a request queue configured to hold threads corresponding to primary memory lookup requests, wherein the request queue is configured to order threads so that returns to primary memory lookup requests are provided in a desired order.

2. The apparatus of claim 1, further comprising:
    a first in first out (FIFO) buffer configured to hold an entry that holds at least a portion of a result of the second secondary memory lookup request; and
    a read holding register configured to hold an entry that includes at least a portion of the entry held in the FIFO buffer.

3. The apparatus of claim 1, further comprising:
a parameter memory configured to store constants that are used to complete the primary memory lookup request; and
a plurality of registers that are operated upon by the logic unit.

4. The apparatus of claim 1, wherein the instructions module comprises:
a program memory configured to store instructions; and
an instructions control module configured to select instructions from the program memory to be executed by the logic unit;
wherein the instructions control module is configured to select instructions for the primary lookup request based on a type associated with the primary lookup request and a program counter.

5. The apparatus of claim 1, further comprising:
an input module configured to receive the primary memory lookup request,
wherein the input module processes the primary memory lookup request to determine an associated type, and
wherein the input module is coupled to the instructions module.

6. The apparatus of claim 1, wherein the apparatus is configured to receive a plurality of primary memory lookup requests, further comprising a thread selection module configured to select a thread associated with a primary memory lookup request of the plurality of primary memory lookup requests based on an available capacity of at least one of a request queue, or a buffer or based on at least one of a probability that the request queue will overflow or a probability that the buffer will overflow.

7. An apparatus, comprising:
an instructions module configured to store instructions to be executed to complete a primary memory lookup request;
a logic unit coupled to the instructions module;
wherein the primary memory lookup request corresponds to a first address in a memory, wherein based on an instruction stored in the instructions module, the logic unit is configured to generate first and second secondary memory lookup requests, and wherein the first secondary memory lookup request corresponds to the first address in the memory and the second secondary memory lookup request corresponds to a second address in the memory, the second address being different from the first address;
a first in first out (FIFO) buffer configured to hold an entry that holds at least a portion of a result of the second secondary memory lookup request; and
a read holding register configured to hold an entry that includes at least a portion of the entry held in the FIFO buffer, wherein the read holding register is configured to hold a plurality of entries, the entries of the plurality of entries being related to the entry of the read holding register.

8. An apparatus, comprising:
an instructions module configured to store instructions to be executed to complete a primary memory lookup request;
a logic unit coupled to the instructions module;
wherein the primary memory lookup request corresponds to a first address in a memory, wherein based on an instruction stored in the instructions module, the logic unit is configured to generate first and second secondary memory lookup requests, and wherein the first secondary memory lookup request corresponds to the first address in the memory and the second secondary memory lookup request corresponds to a second address in the memory, the second address being different from the first address;
a first in first out (FIFO) buffer configured to hold an entry that holds at least a portion of a result of the second secondary memory lookup request; and
a read holding register configured to hold an entry that includes at least a portion of the entry held in the FIFO buffer, wherein the buffer is configured to intercept the results of the second secondary memory lookup request and wherein the buffer is configured not to intercept results of the first secondary a memory lookup request.

9. A method of processing memory lookups requests, comprising:
receiving a primary memory lookup request that corresponds to a first memory address in a memory;
classifying the primary memory lookup request as a memory lookup type;
generating a thread corresponding to the primary memory lookup request; and
generating first and second secondary memory lookup requests;
wherein the first secondary memory lookup request corresponds to the first memory address in the memory and the second secondary memory lookup request corresponds to a second address in the memory, the second address being different from the first memory address.

10. The method of claim 9, wherein the first secondary memory lookup request is generated based on at least the second memory address.

11. The method of claim 9, further comprising:
allocating register space to the thread; and
loading initial values into registers of the allocated register space.

12. The method of claim 11, wherein the initial values are determined based at least on the first memory address and the memory lookup type.

13. The method of claim 9, wherein generating the first and second secondary memory lookup requests comprises:
selecting an instruction from an instruction memory based on the memory lookup type; and
executing the instruction, wherein the instruction results in at least one first or second secondary memory lookup requests being generated.

14. The method of claim 13, further comprising:
receiving a second primary memory lookup request corresponding to a third memory address in the memory;
classifying the second primary memory lookup request as a second memory lookup type;
generating a second thread corresponding to the second primary memory lookup request; and
generating a third secondary memory lookup request corresponding to a fourth memory address.

15. The method of claim 14, further comprising:
holding the second thread in a request queue, wherein the request queue also holds the first thread.

16. The method of claim 14, wherein generating the third secondary memory lookup request comprises:
selecting the second thread for execution;
selecting a second instruction from the instruction memory based on the second memory lookup type; and
executing the second instruction.

17. The method of claim 16, further comprising:
receiving at least a portion of a result of the second secondary memory lookup request in an entry of a buffer;

wherein generating the first and second secondary memory lookup requests comprises:
   selecting the first thread for execution;
   loading at least a portion of the entry into at least one register in the allocated register space;
   selecting a third instruction from an instruction memory based on the first memory lookup type; and
   executing the third instruction, wherein the instruction results in the first secondary memory lookup being executed.

18. The method of claim 9, wherein generating comprises:
designating the first secondary memory lookup request as a final memory lookup request.

19. A system, comprising:
a memory;
an address processing unit (APU) coupled to the memory and configured to receive a primary memory lookup request corresponding to a first address in the memory and to generate first and second secondary memory lookup requests, wherein the first secondary memory lookup request corresponds to the first memory address in the memory and the second secondary memory lookup request corresponds to a second address in the memory, the second address being different from the first memory address; and
request queue configured to hold threads corresponding to primary memory lookup requests, wherein the request queue is configured to order threads so that returns to primary memory lookup requests are provided in a desired order.

20. The system of claim 19, further comprising:
a second memory;
wherein the APU is configured to receive a memory lookup miss of the second memory as the primary memory lookup request.

21. The system of claim 20, wherein at least one of the first memory and the second memory is a cache.

* * * * *